United States Patent
Birrell et al.

[11] Patent Number: 5,805,803
[45] Date of Patent: Sep. 8, 1998

[54] SECURE WEB TUNNEL

[75] Inventors: Andrew D. Birrell, Los Altos; Edward P. Wobber, Menlo Park; Martin Abadi; Raymond P. Stata, both of Palo Alto, all of Calif.

[73] Assignee: Digital Equipment Corporation, Maynard, Mass.

[21] Appl. No.: 855,025

[22] Filed: May 13, 1997

[51] Int. Cl.$^6$ .................................................. G06F 13/14
[52] U.S. Cl. ............................... 395/187.01; 395/188.01; 395/200.58
[58] Field of Search ......................... 395/187.01, 188.01, 395/186, 200.58; 380/3, 25

[56] References Cited

U.S. PATENT DOCUMENTS

| | | | |
|---|---|---|---|
| 5,325,362 | 6/1994 | Aziz | 370/94.3 |
| 5,485,455 | 1/1996 | Dobbins et al. | 370/255 |
| 5,550,984 | 8/1996 | Gelb | 395/200.17 |
| 5,623,601 | 4/1997 | Vu | 395/187.01 |
| 5,720,035 | 2/1998 | Allegre et al. | 395/200.06 |

*Primary Examiner*—Ly Hua
*Attorney, Agent, or Firm*—Dirk Brinkman

[57] ABSTRACT

In a computer implemented method, a client computer connected to a public network such as the Internet makes a request for an intranet resource to a tunnel of a firewall isolating the intranet from the Internet. The request is made in a public message. The tunnel sends a message to the client computer to redirect to a proxy server of the tunnel. The client computer send a token and the request for the resource the proxy server. If the token is valid, the request is forwarded to the intranet, otherwise, the user of the client computer must first be authenticated.

19 Claims, 3 Drawing Sheets

SECURE WEB TUNNEL

FIELD OF THE INVENTION

This invention relates generally to distributed computer systems, and more particularly to securely accessing private systems via a public network.

BACKGROUND OF THE INVENTION

One of the most utilized networks for interconnecting distributed computer systems is the Internet. The Internet allows user of computer systems to exchange data all over the world. Connected to the Internet are many private networks, for example, corporate or commercial networks. These private networks have been called "intranets." To facilitate data exchange, intranets generally use the same communications protocols as the Internet. These Internet protocols (IP) dictate how data are formatted and communicated.

As a characteristic of the Internet, the protocols are layered in a IP stack. At higher levels of the IP stack, such as the application layer (HTTP), the user information is more readily visible, while at lower levels, such as the network level (TCP/IP), the data can merely be observed as packets or a stream of rapidly moving digital signals.

Superimposed on the Internet is a standard protocol interface for accessing World-Wide-Web (Web) resources, such servers, files, Web pages, mail messages, and the like. One way that Web resources can be accessed is by a Web browser such as Netscape Navigator (™), or Microsoft Explorer (™). The locations or addresses of Web resources, at the application layer, are specified with Uniform Resource Locators (URLs), for example, "http://www.digital.com." Gaining access to Web resources is relatively simple. Therefore, it is important that unauthorized access is carefully controlled.

Access to intranets is normally controlled by network gateways including firewalls. Firewalls prevent tampering with private resources by unauthorized users. The firewall can also restrict and track the movement of data from inside the firewall to systems outside the firewall. The operation of the firewall is determined by security policies.

This has created a problem. If a strict security policy is enforced, for example, "never allow an external computer to connect with an internal computer," then there is no satisfactory mechanism to allow a user, who can only connect to the public Internet, to gain access to resources inside the firewall. For example, company employees who are away from the office may need access to private Web servers to read their mail.

There are some prior art mechanisms that provide some access via "tunnels," but these generally have one or more defects or drawbacks. For example, the AltaVista (™) tunnel from Digital Equipment Corporation provides a virtual secure link from a client computer outside the firewall to resources inside the firewall.

The AltaVista tunnel has the following characteristics. Security depends on a detailed understanding of how communication packets might be forwarded within a client computer. As a problem, the AltaVista technique provides access to any resource inside the firewall. This may not be desired. Because the technique operates at lower levels of the protocol stack, it is impractical for the firewall to log or audit all transactions which traverse the firewall, so security breaches are difficult to detect and intercept. In fact, the integrity of an entire internal network depends on low-level configuration options in, for example, employees' lap-top computers which may easily be compromised.

In another prior art technique, an intranet operator may permit a user to "dial-in" from the outside world using a protocol called PPP with authentication by encrypted passwords. However, this methodology violates many security requirements: data traffic typically runs unencrypted over public non-secure lines, and there is almost no auditing or logging of transactions.

In yet another technique, intranets may make specific resources available to computers outside the firewall using a secure protocol such a secure socket layer (SLL). However in many intranets where the resources are too amorphous and constantly changing, it would be impractical or almost impossible to identify specific resources which may be accessed. Therefore, it is desired to provide a secure technique to access selected intranet resources from a client computer connected to the Internet.

SUMMARY OF THE INVENTION

The invention provides a computer implemented method for conducting secure communications with private portions of an intranet connected to a client computer via a tunnel and a public access network such as the Internet. As an advantage, security features are provided using the application layer of the Internet protocol stack.

Initially, the client computer connected to the Internet makes a request for a resource of the intranet in a public message to a redirector of the tunnel. In one aspect of the invention, the tunnel can be implemented as part of an intranet firewall.

In response, the client computer receives from the redirector a redirect reply in a second public message. If the client computer has not been authenticated, the client computer communicates with a checker of the tunnel to perform the necessary authentication. As a result of a successful authentication, the client computer can make the same request for the resource in a first secure message to a proxy server of the tunnel. In this case, the request to the proxy server includes a token. The token can be a secure certificate, or a cookie installed in the client computer as part of the authentication process.

The proxy server, after validating the token, passes the request to the resource via the intranet using a public message. The resource responds to the request, and the reply is forwarded, via the proxy, to the client computer, again using a secure protocol on the public portion of the network.

Authentication of the client computer is performed with the checker of the tunnel using secure messages. For example, the client computer makes a secure authentication request. The checker supplies the client computer with, for example, a HTML "form." The user of the client fills-out the form with appropriate user identification, which when correct, causes the checker to supply the token.

In another aspect of the invention, the messages from the client computer to the tunnel components are formulated by a Web browser. The browser is reconfigured to use secure protocols when communicating with the checker and the proxy server of the tunnel.

DETAILED DESCRIPTION OF PREFERRED EMBODIMENTS

Figure 1:
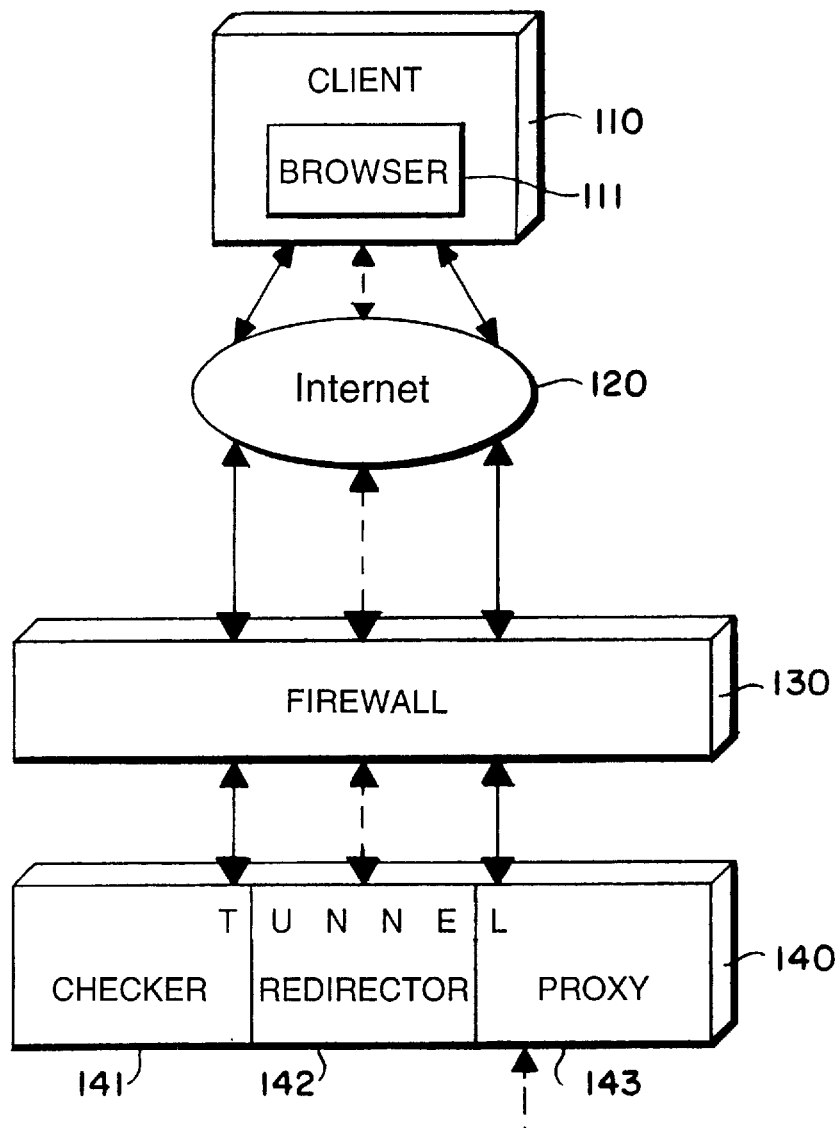
FIG. 1 is a block diagram of an arrangement of a distributed computer system including a secure gateway according to the invention.
Figure 1:
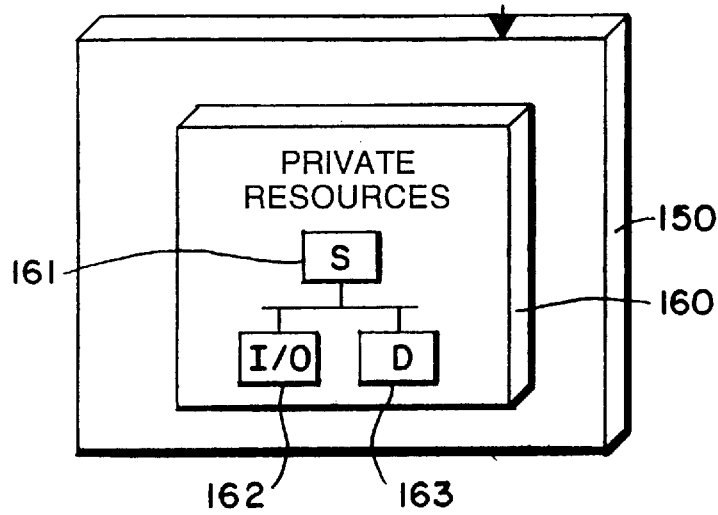

In FIG. 1, an arrangement 100 provides secure access to private intranet resources via a public network. In the Figures, broken lines indicate that signals are communicated using non-secure HTTP protocols, and solid lines indicate secure protocols such as a combination of HTTP and SSL, e.g., HTTPS. Although, specific Internet protocols are suggested because these are widely used by current Web browsers, it should be understood that the invention can just as well be worked with other protocols.

A client computer (CLIENT) 110 is connected to a public network 120, e.g., the Internet. Also connected to the network 120, via a firewall 130 and a tunnel 140, is a private network 150, e.g., an intranet. The intranet 150 includes private resources 160 such as Web servers (S) 161, input/output devices (I/O) 162, and data (D) 163. The data can include Web pages, files, databases, mail messages, and the like.

The client computer 110 can be a workstation, PC, lap-top, or any other conventionally configured computer. The client 110 can be a borrowed or rented. The client 110 executes standard operating system software, e.g., UNIX (™), Windows95 (™), or NT (™), and application software programs. One of the application programs which can execute on the client 110 is a Web browser 111.

The Internet 120 communicates data using Internet protocols (IP) logically arranged in an IP stack. A top or application layer of the IP stack uses HTTP protocols. A firewall 130 prevents unauthorized access to the private resources 160 by enforcing security policies. The tunnel 140, described in greater detail below, allows users of the client 110 to gain access to selected resources 160. In FIG. 1, the firewall 130 and tunnel 140 are shown as a separate component, however, the firewall and tunnel may be implemented as part of a single computer system.

During operation of the arrangement 100, a user of the client 110 desires to access selected private resources without compromising the security policies enforced by the firewall 130. In addition, users of the intranet 150 are allowed to export private data 163 in a secure manner.

Therefore, the tunnel 140 includes a checker 141 a redirector 142, and a proxy server 143. With respect to the Internet 120, the tunnel 140 operates inside the firewall 130. The tunnel 140 can invoke non-secure HTTP and secure HTTPS connections. In the preferred embodiment of the invention, the components 141–143 are implemented as software processes executing on the same system that implements the firewall 130.

However, it is should be understood that these processes could also be implemented with specially designed hardware circuits, or on separate computer systems in cases where the anticipated data traffic is large or geographically dispersed. Although, the invention is described in terms of the HTTP and HTTPS, because these protocols are currently in vogue for Web browsers, any other protocols for performing network transactions would be equally satisfactory.

During operation of the arrangement 100, a user of the client computer 110 makes a connection, via the network 120, with the tunnel 140 using a public Internet service provider (ISP) such as AT&T (™) or Earthlink (™). Alternatively, a computer connected to the Internet at a "cyber-cafe" such as Cybersmith (™) can be used. Many other connection mechanisms can also be used.

Figure 2:
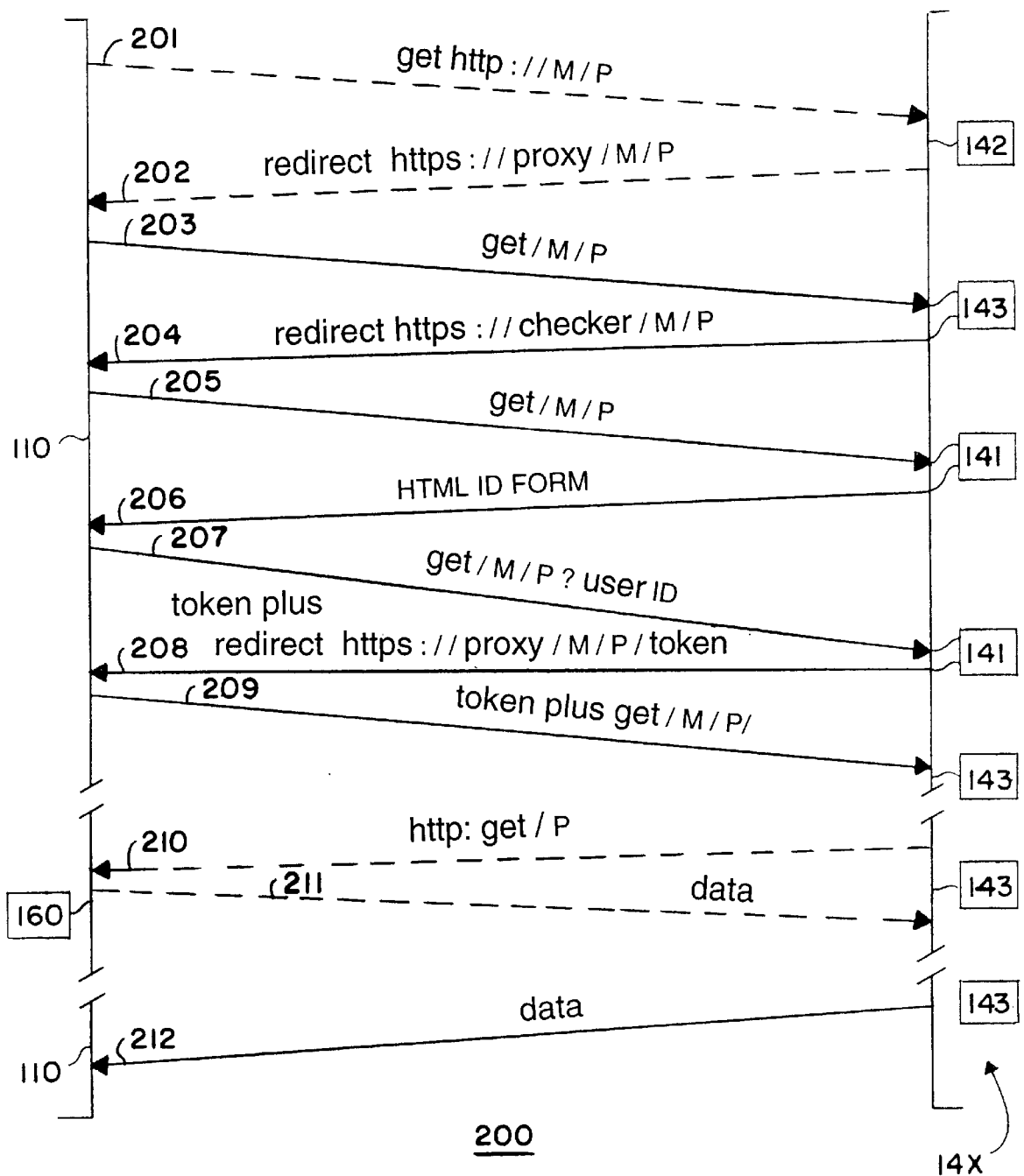
FIG. 2 is a diagram of a message exchange in the system of FIG. 1.
Figure 3:
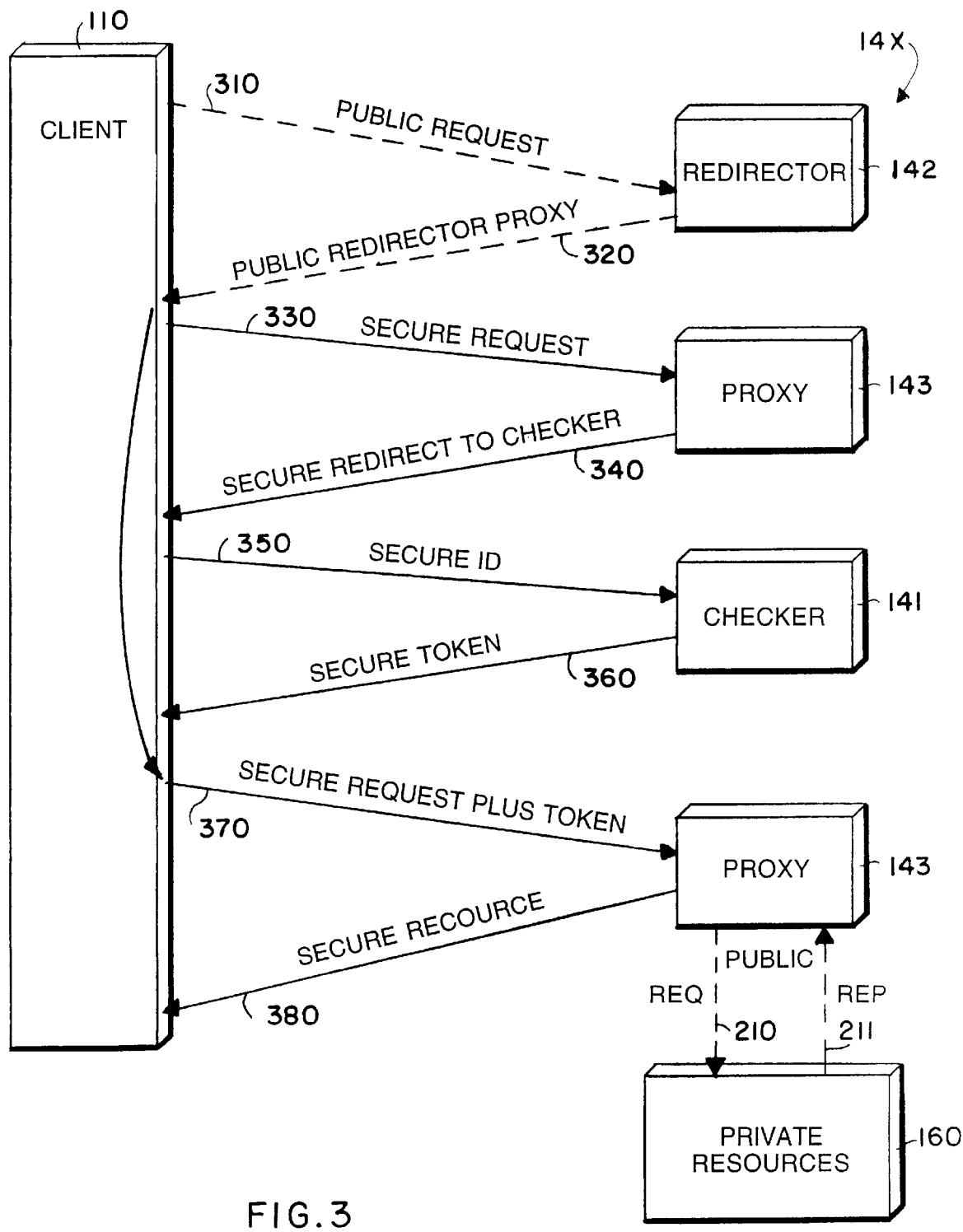
FIG. 3 is a flow diagram of request and responses according to the invention.

FIG. 2 and 3 shows the exchange of messages 200 which occur between the client computer 110, and the components of the tunnel 140 and the resources of the intranet 150 after the connection has been established.

Initially, the user specifies a private intranet resource to be accessed using the browser 111 of the client 110. The location of the private resource is specified using a URL. The public request 310, e.g., "get http://M/P," to access the resource is communicated to the redirector 142 in a message 201 using the non-secure (public) protocol HTTP. The notation "M/P" indicates some resource such as a server, file, Web page, mail message, or the like.

The redirector 142, in a public response 320, responds with a message 202. The message 202 is intended to redirect the browser 111 to communicate with the proxy server 143 using a secure protocol, e.g., HTTPS, in further communications.

At this point, if the client 110 is already known to the proxy server, then proceed with message 209, i.e., request 370 below. Otherwise, in the case where the client is unknown, the redirected browser makes a secure request 330 in a message 203 to the proxy server 143 for the desired resource. In the case, where the client 110 is unknown, the proxy server 143 replies a message 204 to demand that the user makes an authentication request 205 using the checker 141, e.g., a redirect 340 to the checker 141.

In response to the request 205, the checker 141 sends a form 206 to the client computer 110 to allow the user to supply authentication information, for example, a user name and password. User identification (ID) is replied (350) in message 207. Alternatively, a secure challenge-response authentication can be performed with a cryptographic device, such as a cryptokey or smart card, in the user's possession. The name and password can be verified against a user database maintained inside the firewall 130.

As a result of the interchanges with the checker 141, the client computer can be provided, in step 360, a validation token 299 in message 208. The token can be in the form of an X.500 certificate. Alternatively, the token 299 can be a short-term password to authenticate the user on the HTTPS connection. The short-term password might automatically get installed in the client 110 as a Web "cookie" as a side-effect of the interchange. The message 208 also redirects the browser 111 to further communicate with the proxy server 143.

Therefore, in a next message 209, the client send the request for the resource plus the token 299 to the proxy server 143. When the proxy server 143 receives the message, it validates the token 299. If the token is valid, then the proxy server 143 behaves as a conventional proxy server.

The proxy server 143 forwards the authenticated request 210 to the specified resource 160 inside the firewall 130 using the non-secure HTTP protocol. The resource 160 replies to the request with, for example private data, in message 211. The proxy server 143 then forwards the data, using secure HTTPS protocol, in a message 212 (step 380).

Subsequent requests for private resources during the session can be handled as follows. The resource is specified in a public message 201 to the redirector 142. The redirector replies message 202. The client 110 now in possession of the token 299 replies message 208 (step 370) causing the further interchange of message 210–212 between the proxy and the server controlling the private resource 160.

As described above, one aspect of the invention is a mechanism whereby the URL of the requested resource causes the user's Web browser 111 to contact the proxy server 143 of the secure Web tunnel 140. Two possible embodiments of this mechanism are possible.

In a first way, HTTP is replaced with HTTPS while the redirected URL retains the original host name.

In a second way, the redirected URL is chosen so that its "host name" is the host name of the private Web tunnel proxy server 143. In this case, the entire original URL is encoded in the remainder of the redirected URL. When the secure Web tunnel 140 receives a request for such a URL, it can recover the original URL and proxy the request to the resource inside the firewall associated with that URL.

In both ways, the browser configuration causes the tunnel 140 to use the proxy server 143 for the redirected URL. Either mechanism can be used by the invention. The first way is simpler, however the second way offers "transportability" features described below. Therefore, if transportability is desired or required, the second way is preferred.

Transportability is described as follows. A user has used the client computer's browser 111 to access a resource at a URL via the secure Web tunnel 140. The browser 111 will display the redirected URL as the URL (or "location") of the current resource. It is desired, but perhaps not essential, that the user could communicate this URL to another resource inside the firewall so that a user of the resource can use the redirected URL. This feature is called "transportability."

If transportability is deemed a requirement, then it is not possible to use the browser's proxy mechanism to deal with the redirected URL, since other user's browser would not be so configured. Therefore, the first mechanism above is not satisfactory, while the second way guarantees transportability.

Note, when the user accesses the private resource, these resources may well contain links (URLs) to other private resources. For practicality, it is desired that these resources can transparently be accessed without additional work by the tunnel. The tunnel 140 according to the invention achieves this.

In summary, the Web tunnel as described herein provides the following features. The identity of the user can securely be authenticated before a connection with a private resource server is established. Data communicated between the client computer and the intranet 150 is secure from unauthorized eavesdropping. The user can access the resources through the tunnel using HTTPS SSL without any modifications of the intranet or the client themselves.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A computer implemented method for accessing a resource (of an intranet using a client computer connected to a public network, comprising the steps of:

receiving in a tunnel of a network firewall a request for a resource of an intranet in a first public message over the public network from a client computer;

sending, from the tunnel to the client computer, a redirect to a proxy server request in a second public message;

receiving, from the client computer in the proxy server, a token and the request for the resource in a first secure message over the public network; and forwarding, from the proxy server, the request for the resource to the intranet if the token is valid.

2. The method of claim 1 further comprising:

replying to the request for the resource from the intranet to the proxy server.

3. The method of claim 1 further comprising:

replying to the request for the resource from the proxy server to the client computer in a second secure message over the public network.

4. The method of claim 1 further comprising:

sending, from the proxy server to the client computer, a redirect to a checker request in a third secure message if the token is invalid.

5. The method of claim 4 further comprising:

sending, from the checker to the client computer, the token in a fourth secure message if a user of the client computer is authenticated.

6. The method of claim 4 further comprising:

sending a user identification form to a Web browser of the client computer; and receiving user identification from the client computer.

7. The method of claim 1 wherein the token is an Internet cookie temporarily installed in the client computer.

8. The method of claim 1 wherein the token is a secure certificate.

9. The method of claim 1 wherein the first public message is received by a redirector of the tunnel.

10. The method of claim 1 further comprising:

reconfiguring, by the client computer, a Web browser of the client computer in response to the second public message.

11. The method of claim 1 wherein the resource is a data record of the intranet.

12. The method of claim 11 wherein the data record is a Web page.

13. The method of claim 11 wherein the data record is a mail message.

14. The method of claim 1 wherein the resource is a server of the intranet.

15. The method of claim 1 wherein the tunnel includes the proxy server.

16. The method of claim 1 wherein the public messages are communicated using HTTP protocols, and the secure messages are communicated using HTTPS protocols.

17. The method of claim 16 wherein the HTTPS protocol includes a secure socket layer.

18. The method of claim 1 wherein the network is the Internet, and the firewall isolates the intranet from the Internet.

19. The method of claim 1 wherein the first public message is received by a redirector of the tunnel, and wherein the token is validated by a checker of the tunnel.

* * * * *